Patented Nov. 16, 1943

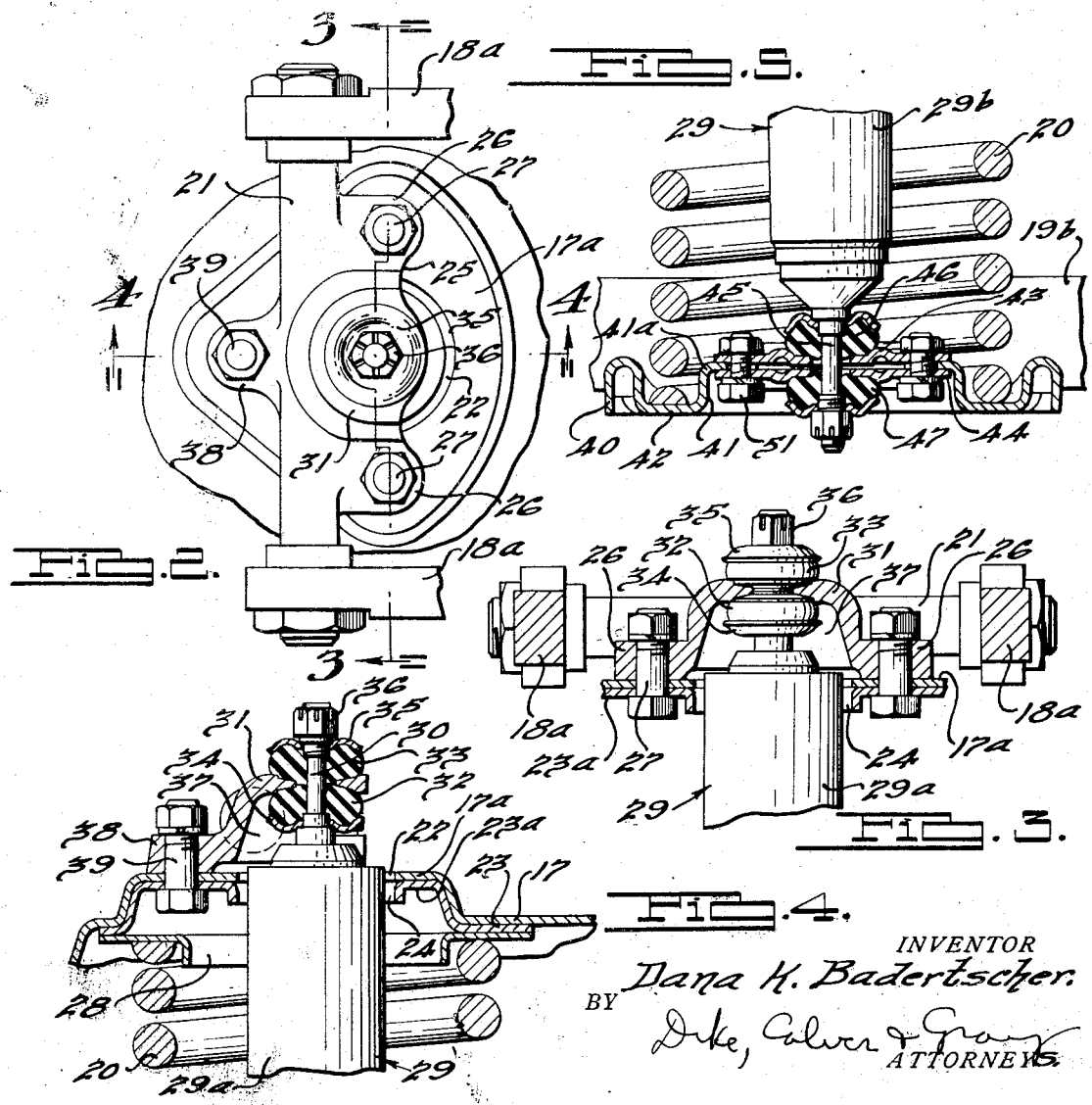

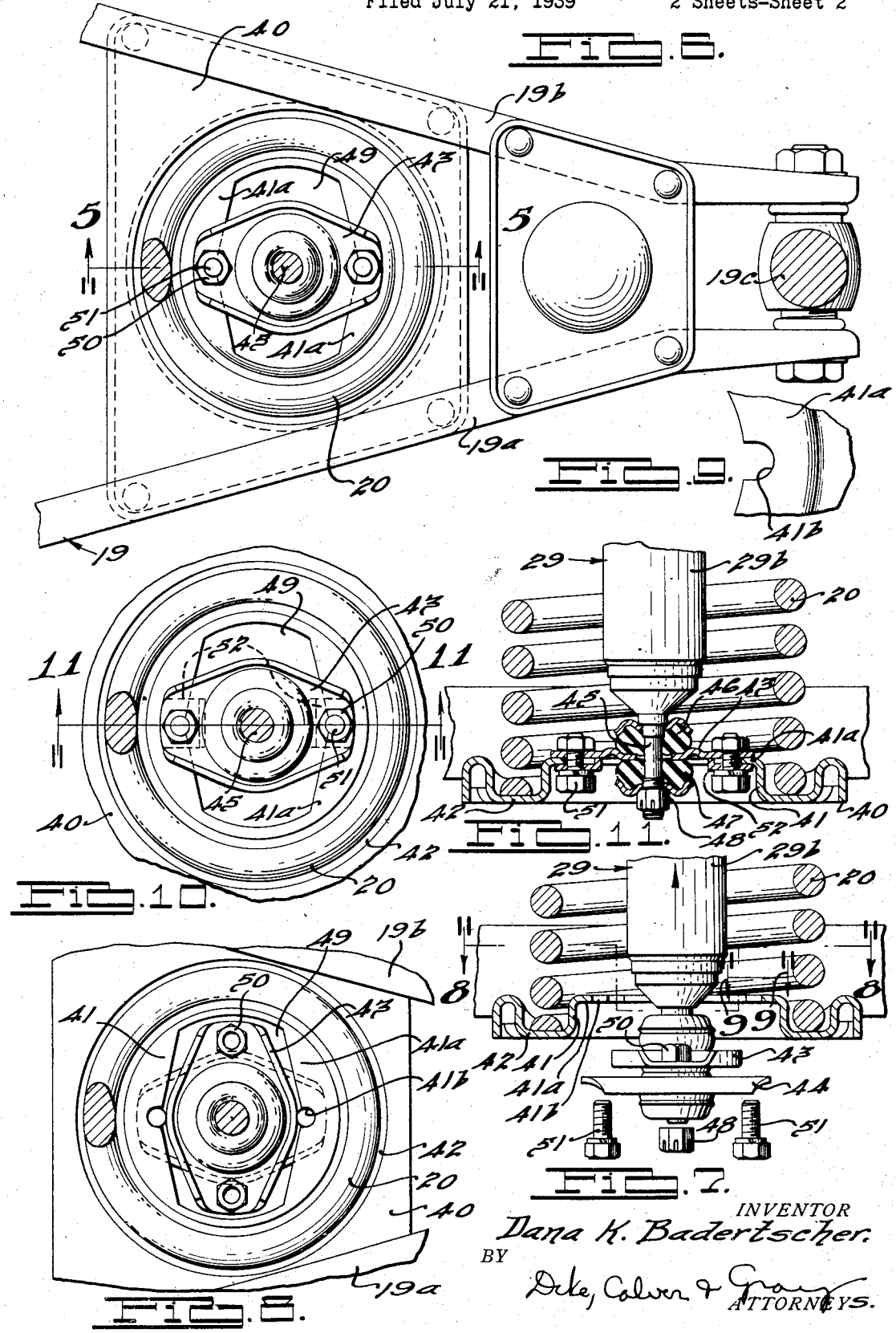

2,334,597

UNITED STATES PATENT OFFICE 2,334,597

WHEEL SUSPENSION

Dana K. Badertscher, Grosse Pointe, Mich., assignor to Hudson Motor Car Company, Detroit, Mich., a corporation of Michigan Application July 21, 1939, Serial No. 285,752

18 Claims. (Cl. 267—20)

This invention relates to motor vehicles and more particularly to vehicles, such as automobiles, in which the body is sprung with respect to certain of the road wheels in such manner that the wheels are capable of independent vertical motion. In particular the invention relates to such a vehicle in which the road wheels are each mounted at the outer ends of upper and lower pivoted control arms with a coil spring interposed between the lower control arm and a member of the frame.

An object of the invention is to provide a wheel suspension of the foregoing type in which the shock absorber extends through the coil load spring and is mounted at opposite ends to the lower control arm and the frame in such improved manner as to provide maximum efficiency and effectiveness of the shock absorber in operation while providing a compact structure permitting ready removal or installation of the shock absorber for service or other purposes.

Another object of the invention is to provide a structure of the foregoing type in which the shock absorber extends entirely through the load spring and is detachably as well as resiliently mounted at opposite ends so that the shock absorber may be removed by passing the same bodily down through the lower control arm of the suspension or vice versa.

Other objects of this invention will appear in the following description and appended claims, reference being had to the accompanying drawings forming a part of this specification wherein like reference characters designate corresponding parts in the several views.

Fig. 1 is a front end elevation, partly broken away, illustrating an independent front wheel suspension for an automobile embodying the present invention.

Fig. 2 is an enlarged fragmentary top plan view taken substantially through lines 2—2 of Fig. 1 looking in the direction of the arrows.

Fig. 3 is a vertical section taken substantially through lines 3—3 of Fig. 2 looking in the direction of the arrows.

Fig. 4 is a section taken substantially through lines 4—4 of Fig. 2 looking in the direction of the arrows.

Fig. 5 is a section taken substantially through lines 5—5 of Fig. 6 looking in the direction of the arrows.

Fig. 6 is an enlarged section taken substantially through lines 6—6 of Fig. 1 looking in the direction of the arrows.

Fig. 7 is an exploded view of the structure shown in Fig. 5 illustrating the parts preparatory to the installation of the shock absorber.

Fig. 8 is a section taken substantially through lines 8—8 of Fig. 7 looking in the direction of the arrows.

Fig. 9 is a detail plan view taken from lines 9—9 of Fig. 7.

Fig. 10 is a fragmentary view corresponding in part to Fig. 6 but illustrating a modified mounting for the lower end of the shock absorber.

Fig. 11 is a section taken substantially through lines 11—11 of Fig. 10 looking in the direction of the arrows.

Before explaining in detail the present invention it is to be understood that the invention is not limited in its application to the details of construction and arrangement of parts illustrated in the accompanying drawings, since the invention is capable of other embodiments and of being practiced or carried out in various ways. Also it is to be understood that the phraseology or terminology employed herein is for the purpose of description and not of limitation, and it is not intended to limit the invention claimed herein beyond the requirements of the prior art.

In the drawings there are illustrated, by way of example, certain embodiments of the present invention as applied to an independent front wheel suspension for an automotive vehicle. It will be understood that the invention may be applied also to an independent rear wheel suspension. The front wheels 15 of the vehicle are mounted upon the vehicle frame for independent movements in a vertical direction. Any suitable construction may be utilized for accomplishing the independent mounting of these wheels, one suitable construction of generally conventional nature being herein illustrated by way of example. The frame of the vehicle comprises side frame members or sills 16 which are connected together at their forward ends by means of a frame cross member 17 of hollow generally boxlike construction. Each wheel 15 is mounted upon the frame for vertical movements through the medium of upper and lower control arms 18 and 19 which are pivotally mounted at their inner ends upon the frame cross member 17. The outer ends of each pair of arms 18 and 19 are pivotally connected together through the medium of a vertically extending knuckle bracket 19c which carries the king pin upon which the wheel 15 is mounted for steering movement. Interposed between each of the lower control arms 19 and the outer end of the frame cross member 17 is a coil load spring 20. It will be understood that the general construction of the upper and lower control arms, the knuckle bracket 18c, the arrangement and mounting of these members together with the arrangement of the spring 20 may be of conventional construction and form no part per se of the present invention.

In the present instance the upper control arm 18 is shown as of the wish bone type having spaced arms 18a which are pivotally mounted upon the outer ends of a transverse bracket bar 21 mounted upon the upper end of the frame cross member 17. This cross member at each end is pressed to provide an upwardly extending hollow embossment 17a, see Fig. 4, which is formed with an opening or aperture 22. A pressed metal reinforcing piece 23 formed at 23a to fit within the embossment 17a is spot welded to the inner face of the frame member 17 and is provided with a flanged aperture 24 registering with the aperture 22. The bracket bar 21 has a lateral offset portion 25, each end of which being formed with a seat 26 resting upon the face of the embossment 17a and bolted thereto at 27. Beneath the reinforcing plate 23 is located a spring retainer plate 28 which receives the upper end of the coil load spring 20.

In accordance with the present invention a shock absorber 29 of the telescopic type is mounted to extend axially through the center of each of the coil load springs 20. This shock absorber may be of conventional construction having an upper fixed cylindrical casing 29a and a lower cylindrical or tubular casing 29b which is telescoped into the upper portion 29a and is adapted to reciprocate therein, this shock absorber being of the hydraulic type and well known in the art. The upper casing member 29a extends freely through the apertures 24 and 22 and is provided with a fixed projecting stem or rod 30 by which the upper end of the shock absorber may be adjustably or detachably mounted. The extension or offset 25 of the bracket bar 21 is formed intermediate the attaching bolts 27 with an upwardly extending hollow extension 31 provided with a central aperture through which the stem 30 extends. As illustrated in Figs. 3 and 4 two centrally apertured rubber biscuits 32 and 33 are arranged upon the stem 30 below and above the upper wall of the hollow boss 31, these biscuits or bushings being held by pressed metal retainers 34 and 35, respectively. The upper end of the shock absorber is clamped to the boss 31 through the medium of a nut 36 which is drawn down to place the rubber bushings under relatively high compression. Thus, it will be seen that the upper member 29a of the shock absorber is yieldingly attached to the boss 31 so as to allow for small vertical movements against the resistance of the rubber members 32 and 33, this boss providing a recess 37 to receive the upper end of the casing 29a and also the lower portion of the rubber mounting.

Each bracket bar 21 to which the upper control arm is pivoted for rocking movements has a third point of attachment to the embossment 17a of the frame cross member 17, comprising a lug 38 to receive the bolt 39.

Each lower control arm 19 is longer than the corresponding upper control arm and is pivotally mounted in any suitable manner to the underside of the cross frame member 17, as shown in Fig. 1. This lower control arm is shown as comprising spaced channel-shaped side members 19a and 19b connected intermediate their ends by a load spring supporting plate 40. The plate 40 is pressed from sheet metal to provide marginal downwardly extending flanging and a central upwardly extending embossment 41 providing an annular groove 42 for the reception of the lower end of the coil spring 20.

Referring to the embodiment illustrated in Figs. 5 to 8 inclusive, the lower reciprocating member 29b of the shock absorber is connected to the upper marginal flange 41a of the embossment 41 in improved manner to permit the shock absorber to be assembled or removed through the bottom of the spring supporting plate 40. In the illustrated construction there are provided upper and lower clamping plates 43 and 44 of similar construction but arranged in reverse relation upon the projecting stem or shaft 45 of the shock absorber member 29b. Mounted upon the stem 45 above and below the clamping plates 43 and 44 are rubber biscuit assemblies 46 and 47 similar to those previously described. The lower end of the shock absorber may be assembled with respect to the clamping plates 43 and 44 through the medium of a nut 48 which may be drawn up to place the rubber bushings 46 and 47 under compression as illustrated.

The upper wall of the embossment 41 is cut away to provide an elongated aperture 49, this aperture being sufficiently long to accommodate the longer dimension of the clamping or supporting plate 43 but having a shorter dimension substantially less than the length of this plate, as illustrated in Fig. 8. Thus, the plate 43 may be assembled and arranged upon the upper surface of the flange 41a by passing it through the aperture 49, see Fig. 8, and then turning the plate 43 at right angles so as to overlie the opposite flanges 41a as shown in Fig. 6. The flanging 41a is provided with opposed notches 41b adapted to register with the threaded openings in nuts 50 secured as by welding to the upper side of the plate 43. With this plate turned to the position shown in Fig. 6 the lower clamping plate 44 may be pressed against the bottom face of the flanging 41a and the plates 43 and 44 then secured together by bolts 51 passing through notches 41b and secured into nuts 50 to clamp the flanging 41a of the plate 40 firmly between the plates. Thereupon the lower rubber bushing assembly 47 and the nut 48 may be installed upon the end of the spindle 45 and the nut drawn up to complete the final installation as illustrated in Fig. 5.

The embodiment illustrated in Figs. 10 and 11 is substantially the same as that shown in Fig. 5 with the exception that the clamping plate 44 is dispensed with and separate clamps 52 substituted therefor. Each clamp 52 when installed underlaps the flange 41a at the notch 41b and has an inner bent up flange to engage the bottom face of the clamping plate 43. The installation of the plate 43 in the embodiment of Figs. 10 and 11 is the same as that previously described, this plate being clamped to the flanging 41a through the medium of the small substantially square clamps 52 and the bolts 51 which pass therethrough and also through the notches 41b.

Thus, it will be seen that the shock absorber 29 may be easily installed or removed for service without disturbing the wheel suspension arms 18 and 19 or the load spring 20. By removing the upper and lower nuts 36 and 48, then removing bolts 51 and turning plate 43 to the position of Fig. 8 the entire shock absorber may be removed through the bottom of the load spring supporting plate 40. Conversely, the shock absorber may be installed by passing it up through the opening 49 in the plate 40, through the spring and thence passing the stem 30 through the central aperture in boss 30. The plate 43 is passed through opening 49, turned at right angles, and thereafter the stems 45 and 30 fastened in place by the nuts 48 and 36.

I claim:

1. In a motor vehicle having a frame, upper and lower control arms pivoted at their inner ends to the frame, a road wheel mounted at the corresponding outer ends of the arms, a coil load spring interposed between the lower arm and the frame, a shock absorber extending through said spring, a plate carried by the lower arm for supporting the load spring and having an aperture through which the shock absorber may be passed to install or remove the same, said plate having an internal substantially horizontal flange at opposite sides of said aperture, and clamping means carried by said shock absorber and insertable or removable through the aperture for engagement with said flange to support the lower end of the shock absorber.

2. In a motor vehicle having a frame, upper and lower control arms pivoted at their inner ends to the frame, a road wheel mounted at the corresponding outer ends of the arms, a coil load spring interposed between the lower arm and the frame, a shock absorber extending through said spring, a plate carried by the lower arm to receive the lower end of the load spring and having an aperture, and a shock absorber supporting plate adapted to be passed through the aperture and turned into position to rest upon opposite side edges of said first named plate.

3. A structure according to claim 2 in which the shock absorber has a stem extending downwardly through an aperture in the shock absorber supporting plate and rubber bushings are arranged on the stem above and below the supporting plate in operative engagement therewith.

4. A structure according to claim 2 comprising devices accessible from beneath the lower arm for clamping said plates together and for attaching the lower end of the shock absorber to its supporting plate.

5. In a motor vehicle having a frame, upper and lower control arms pivoted at their inner ends to the frame, a road wheel mounted at the corresponding outer ends of the arms, a coil load spring interposed between the lower arm and the frame, a shock absorber extending through said spring, a plate carried by the lower arm to receive the lower end of the load spring and having an aperture, a shock absorber supporting plate adapted to be passed through the aperture and turned into position to rest upon opposite side edges of said first named plate, said shock absorber having a stem extending downwardly through an aperture in said supporting plate, rubber bushings arranged on said stem above and below the supporting plate in operative engagement therewith, and devices accessible from beneath said lower arm for clamping said plates together and for attaching the lower end of the shock absorber to said supporting plate.

6. In a motor vehicle having a frame, a lower control arm pivoted at its inner end to the frame, an upper control arm, a bracket attached to the top of the frame for pivotally supporting the inner end of the upper control arm, a road wheel mounted at the outer ends of the control arms, a coil load spring interposed between the lower arm and frame, a telescopic shock absorber extending through said spring, a plate carried by the lower arm to receive the lower end of the spring, said bracket and frame having registering apertures one above the other to receive the upper end of the shock absorber, means for yieldingly and detachably securing said upper end to the bracket, said plate having an aperture through which the shock absorber may be passed bodily to install or remove the same, and means for yieldingly and detachably securing the lower end of the shock absorber to said plate.

7. In a motor vehicle having a frame, pairs of upper and lower swinging control arms for supporting a road wheel, a coil load spring interposed between the lower pair of control arms and frame, a shock absorber extending freely through the spring and frame, a bracket on the frame having an aperture for the free passage of the upper end of the shock absorber, rubber cushioning means interposed between the shock absorber and bracket at the locality of said aperture, a plate carried by the lower pair of arms for supporting the load spring and having an aperture through which the shock absorber may be passed to install or remove the same, and means mounted on said plate and insertable or removable through the aperture for supporting the lower end of the shock absorber, the upper end of said shock absorber being mounted in said bracket at a point intermediate the inner ends of said upper pair of control arms.

8. In a motor vehicle having a frame, upper and lower swinging control arms for supporting a road wheel, a coil load spring interposed between the lower control arm and frame, a shock absorber extending freely through the spring and frame, a bracket on the frame having an aperture for the free passage of the upper end of the shock absorber, rubber cushioning means interposed between the shock absorber and bracket at the locality of said aperture, a plate carried by the lower arm to receive the lower end of the load spring and having an aperture, and a shock absorber supporting plate adapted to be passed through the aperture and turned into position to rest upon opposite side edges of said first named plate.

9. A structure according to claim 8 in which the shock absorber has a stem extending downwardly through an aperture in the shock absorber supporting plate and rubber bushings are arranged on the stem above and below the supporting plate in operative engagement therewith.

10. A structure according to claim 8 comprising devices accessible from beneath the lower arm for clamping said plates together and for attaching the lower end of the shock absorber to its supporting plate.

11. In a motor vehicle having a frame, upper and lower swinging control arms for supporting a road wheel, a coil load spring interposed between the lower control arm and frame, a shock absorber extending freely through the spring and frame, a load spring supporting plate carried by the lower arm having an elongated aperture of a size to permit free passage of the shock absorber therethrough, detachable means including a pair of superimposed clamping plates engaging opposite faces of said spring supporting plate for clamping the lower end of the shock absorber to said plate in line with said aperture, and detachable means for securing the upper end of the shock absorber to the frame.

12. A structure according to claim 11 in which said first named means is adapted to be passed through the aperture and includes attaching devices accessible from beneath the lower arm.

13. In a motor vehicle having a frame, pairs of upper and lower swinging control arms for supporting a road wheel, a coil load spring interposed between the lower pair of control arms and frame, a shock absorber extending freely through the spring and frame, a bracket on the top of the frame for pivotally supporting the upper pair of arms and having an apertured hollow boss, and a stem on the shock absorber extending through the aperture in the boss and resiliently secured therein at a point intermediate the inner ends of said upper pair of control arms.

14. In a motor vehicle having a frame, a lower control arm pivoted at its inner end to the frame, an upper control arm, a bracket attached to the top of the frame for pivotally supporting the inner end of the upper control arm, a road wheel mounted at the outer ends of the control arms, a coil load spring interposed between the lower arm and frame, a telescopic shock absorber extending through said spring, a plate carried by the lower arm to receive the lower end of the spring, said bracket having an upwardly extending hollow embossment to receive the upper end of the shock absorber and provided with an aperture through which the upper end of the shock absorber extends, cushioning means interposed between the shock absorber and bracket within said embossment, said plate having an aperture therein through which the shock absorber may be passed bodily to install or remove the same, and means for yieldingly and detachably securing the lower end of the shock absorber to the plate.

15. An automotive wheel suspension comprising a frame with a cross member having a dome pressed upwardly from the end thereof, an upper control arm pivoted to said dome, a lower control arm pivoted to said frame, a support arm pivoted between the ends of said control arms, a coil spring positioned between said frame and said lower control arm, and a strut type shock absorber positioned between said dome and said lower control arm, said shock absorber being located within said coil spring.

16. An automotive wheel suspension comprising a frame with a cross member having a dome pressed upwardly from the end thereof, a pivot member secured to said dome, an upper control arm pivoted to said pivot member, a lower control arm pivoted to said cross member, a support arm pivoted between the ends of said control arms, a coil spring positioned between said frame and said lower control arm, and a strut type shock absorber extending between said dome and said lower control arm and located within said coil spring.

17. An automotive wheel suspension comprising a frame including a cross member having a dome pressed upwardly from the end thereof, a pivot member rigidly secured to said dome, a bifurcated upper control arm having its ends pivoted to the ends of said pivot member, a lower control arm pivoted to said cross member, a support arm pivoted between the ends of said control arms, a coil spring positioned between said frame and said lower control arm, and a shock absorber extending between said dome and said lower control arm and located within said coil spring.

18. An automotive wheel suspension comprising a front cross frame member having an aperture in the upper outer end thereof, a bracket rigidly secured to the top of the frame member and overlying said aperture, said bracket having an aperture above said first aperture, a pivot member fixed to said bracket and extending transversely to said frame member, a bifurcated control arm having its ends pivoted to the ends of said pivot member, a coil spring having its upper end operatively engaging said frame member, a shock absorber located within said spring, the upper end of the shock absorber extending through said apertures and yieldingly connected to the bracket at the locality of the said aperture therein.

DANA K. BADERTSCHER.